(12) United States Patent
Ho et al.

(10) Patent No.: US 10,630,087 B2
(45) Date of Patent: Apr. 21, 2020

(54) UNINTERRUPTIBLE POWER SUPPLY AND BATTERY MANAGEMENT APPARATUS THEREOF

(71) Applicant: CYBER POWER SYSTEMS, INC., Taipei (TW)

(72) Inventors: Lien-Hsun Ho, Taipei (TW); Kai-Tsung Yang, Taipei (TW)

(73) Assignee: CYBER POWER SYSTEMS, INC., Taipei (TW)

( * ) Notice: Subject to any disclaimer, the term of this patent is extended or adjusted under 35 U.S.C. 154(b) by 147 days.

(21) Appl. No.: 15/903,594

(22) Filed: Feb. 23, 2018

(65) Prior Publication Data

US 2019/0214834 A1    Jul. 11, 2019

(30) Foreign Application Priority Data

Jan. 5, 2018  (CN) .......................... 2018 1 0010553

(51) Int. Cl.
*H02J 7/00*    (2006.01)
(52) U.S. Cl.
CPC ............ *H02J 7/0026* (2013.01); *H02J 7/007* (2013.01); *H02J 7/0014* (2013.01)
(58) Field of Classification Search
CPC ......... H02J 7/007; H02J 7/0014; H02J 7/0026

USPC ............................................................. 307/20
See application file for complete search history.

(56) References Cited

FOREIGN PATENT DOCUMENTS

| TW | 2017-11337 A | 3/2017 |
|---|---|---|
| TW | 2017-33234 A | 9/2017 |
| TW | 2018-01441 A | 1/2018 |

*Primary Examiner* — Hal Kaplan
(74) *Attorney, Agent, or Firm* — Bacon & Thomas, PLLC

(57) ABSTRACT

The invention provides an uninterruptible power supply, which comprises a battery management circuit and a control circuit. The battery management circuit is electrically coupled to each battery of at least one battery string for measuring the voltage of each battery. When the battery strings discharge, the control circuit obtains the voltage of each battery through the battery management circuit to calculate the discharge current of each battery, and determines whether there is any measured voltage having dropped to an EOD voltage corresponding to a discharge current of a corresponding battery. When the determination result is positive, the control circuit controls the uninterruptible power system to stop the discharging of at least one battery string in which there is at least one measured voltage having dropped to an EOD voltage corresponding to a discharge current of a corresponding battery. Furthermore, a corresponding battery management apparatus is also provided.

20 Claims, 4 Drawing Sheets

UNINTERRUPTIBLE POWER SUPPLY AND BATTERY MANAGEMENT APPARATUS THEREOF

BACKGROUND OF THE INVENTION

Field of the Invention

The present invention relates to the technical field of battery management, and more particularly, to an uninterruptible power supply and a battery management apparatus thereof.

Description of Related Art

Generally speaking, multiple battery strings are used inside an uninterruptible power supply (UPS), and these battery strings are used in parallel. Since each battery in each battery string can provide, for example, a voltage of 6V or 12V, this approach can increase the discharge time of a UPS in battery mode.

However, due to process variations and the like, the characteristics (such as storage capacity) of these batteries in the UPS cannot be exactly the same. The batteries with the worst characteristics often discharge below the permissible discharge voltage (the so-called end-of-discharge voltage, referred to as the EOD voltage) of the battery when discharged, resulting in early damage, and thus making the same battery string abnormal or unusable. Further, this may affect the other battery strings, so that the lives of the affected batteries are reduced a lot.

SUMMARY OF THE INVENTION

An object of the present invention is to provide a UPS, which can determine whether there is any measured voltage having dropped to an EOD voltage corresponding to a discharge current of a corresponding battery. When the determination result is positive, the UPS stops the discharging of at least one battery string in which there is at least one measured voltage having dropped to an EOD voltage corresponding to a discharge current of a corresponding battery.

Another object of the present invention is to provide a corresponding battery management apparatus, which is suitable to be used in a UPS.

To achieve the foregoing and other objects, a UPS for providing an alternating current voltage (AC voltage) is provided. The UPS comprises a battery management circuit and a control circuit. The battery management circuit is electrically coupled to each battery of at least one battery string for measuring the voltage of each battery. The control circuit is electrically coupled to the battery management circuit. When the battery strings discharge, the control circuit obtains the voltage of each battery through the battery management circuit to calculate the discharge current of each battery, and determines whether there is any measured voltage having dropped to an EOD voltage corresponding to a discharge current of a corresponding battery. When the determination result is positive, the control circuit controls the UPS to stop the discharging of at least one battery string in which there is at least one measured voltage having dropped to an EOD voltage corresponding to a discharge current of a corresponding battery.

To achieve the foregoing and other objects, a battery management apparatus is provided. The battery management apparatus comprises a battery management circuit and a control circuit. The battery management circuit is electrically coupled to each battery of at least one battery string for measuring the voltage of each battery. The control circuit is electrically coupled to the battery management circuit. When the battery strings discharge, the control circuit obtains the voltage of each battery through the battery management circuit to calculate the discharge current of each battery, and determines whether there is any measured voltage having dropped to an EOD voltage corresponding to a discharge current of a corresponding battery. When the determination result is positive, the control circuit outputs a control signal.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
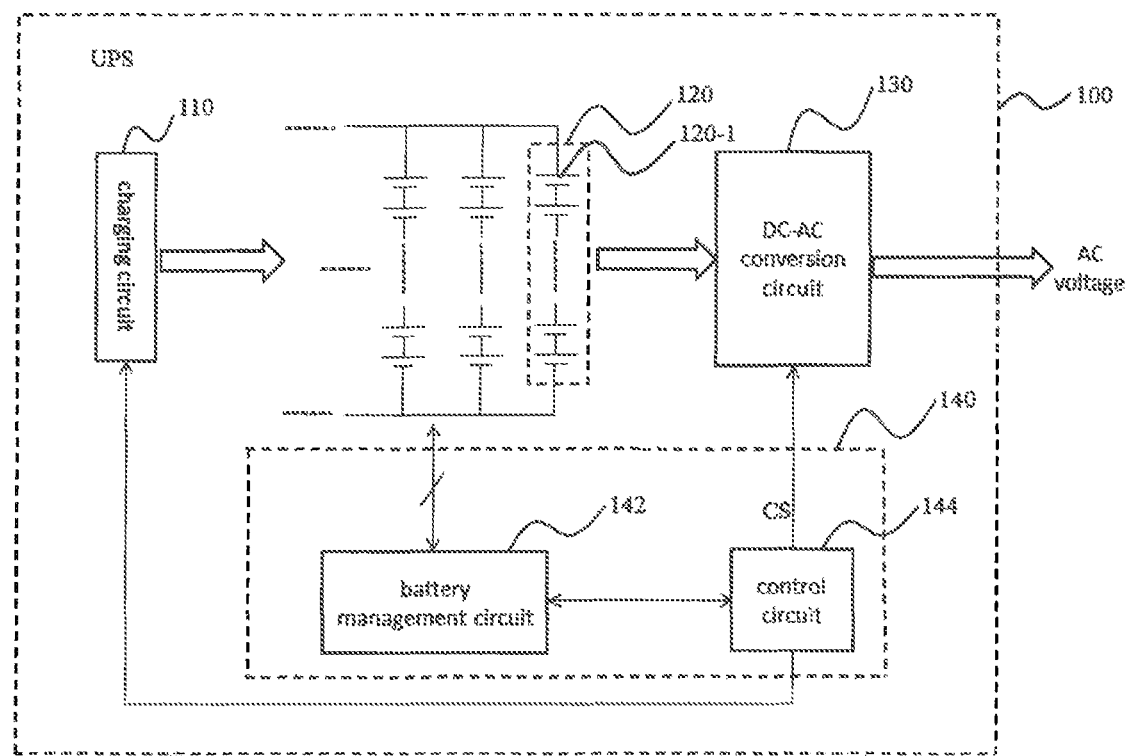
FIG. 1 shows a UPS according to an embodiment of the present invention.

FIG. 1 shows a UPS according to an embodiment of the present invention. As shown in FIG. 1, a UPS 100 is used to provide an AC voltage. The UPS 100 comprises a charging circuit 110, at least one battery string 120, a DC-AC conversion circuit 130 and a battery management apparatus 140. Each battery string 120 is formed by connecting a plurality of batteries 120-1 in series. In addition, the battery management apparatus 140 further comprises a battery management circuit 142 and a control circuit 144. The charging circuit 110 is electrically coupled to each battery string 120 for charging each battery 120-1. The DC-AC conversion circuit 130 is electrically coupled to the battery strings 120 to convert the DC voltage provided by the battery strings 120 into an AC voltage, so as to provide the AC voltage to a load (not shown). That is, the battery strings 120 supply power required by the load through the DC-AC conversion circuit 130.

The battery management circuit 142 is electrically coupled to each battery 120-1 for measuring the voltage of each battery 120-1 (i.e., for measuring the voltage across each battery 120-1). The control circuit 144 is electrically coupled to the battery management circuit 142 and the DC-AC conversion circuit 130. When the battery strings 120 discharge to the load through the DC-AC conversion circuit 130, the control circuit 144 obtains the voltage of each battery 120-1 through the battery management circuit 142 to calculate the discharge current of each battery 120-1, and determines whether there is any measured voltage having dropped to an EOD voltage corresponding to a discharge current of a corresponding battery. In an embodiment, the control circuit 144 records a plurality of EOD voltages corresponding to different discharge currents of the batteries for searching. Table 1 below shows one of the recording manners.

TABLE 1

| discharge current | EOD voltage |
|---|---|
| 0.5 A | 10.5 V |
| 2 A | 10 V |
| 10 A | 9 V |
| . | . |
| . | . |
| . | . |

As mentioned above, when the determination result is positive, the control circuit 144 outputs a control signal CS to disable the DC-AC conversion circuit 130 to stop the discharging of all the batteries 120-1. In this way, each battery 120-1 can be prevented from damage due to overdischarge, so as to achieve the purpose of protecting the batteries 120-1 and prolonging the life of the batteries 120-1.

In addition, in an embodiment, the control circuit 144 calculates the discharge current of each battery 120-1 according to a power consumption of the load, a conversion efficiency of the DC-AC conversion circuit 130, a total number of the batteries 120-1 and the measured voltages. The discharge current of each battery 120-1 can be calculated by the following equations (1) to (3) in order:

$$\text{total output power of the batteries} = \frac{\text{power consumption of the load}}{\text{conversion efficiency of the DC-AC conversion circuit}} \quad (1)$$

$$\text{output power of each battery} = \frac{\text{total output power of the batteries}}{\text{total number of the batteries}} \quad (2)$$

$$\text{discharge current of a battery} = \frac{\text{output power of each battery}}{\text{the measured voltage of the battery}} \quad (3)$$

Assume that the power consumption of the load is 500 W, the conversion efficiency of the DC-AC conversion circuit 130 is 0.8, and there are only four batteries 120-1 in the UPS 100. In this case, when the measured voltage of a battery 120-1 is 12V, the discharge current of this battery 120-1 is 13A. Therefore, the control circuit 144 can search out the EOD voltage corresponding to the calculated discharge current from the above Table 1, so as to determine whether the measured voltage of this battery 120-1 has dropped to the EOD voltage corresponding to the calculated discharge current.

In addition, in an embodiment the battery management circuit 142 further performs a voltage balancing operation on the batteries 120-1. When the charging circuit 110 charges the battery strings 120, the control circuit 144 obtains the voltage of each battery 120-1 through the battery management circuit 142 and determines whether there is any measured voltage having risen to an overcharge threshold (i.e., the maximum charging voltage that the battery 120-1 can bear). Whenever the determination result is positive, the control circuit controls the charging circuit to suspend charging the battery strings until the battery management circuit 142 rebalances the voltages of the batteries 120-1, and then controls the charging circuit 110 to continue to charge the battery strings 120.

Figure 2:
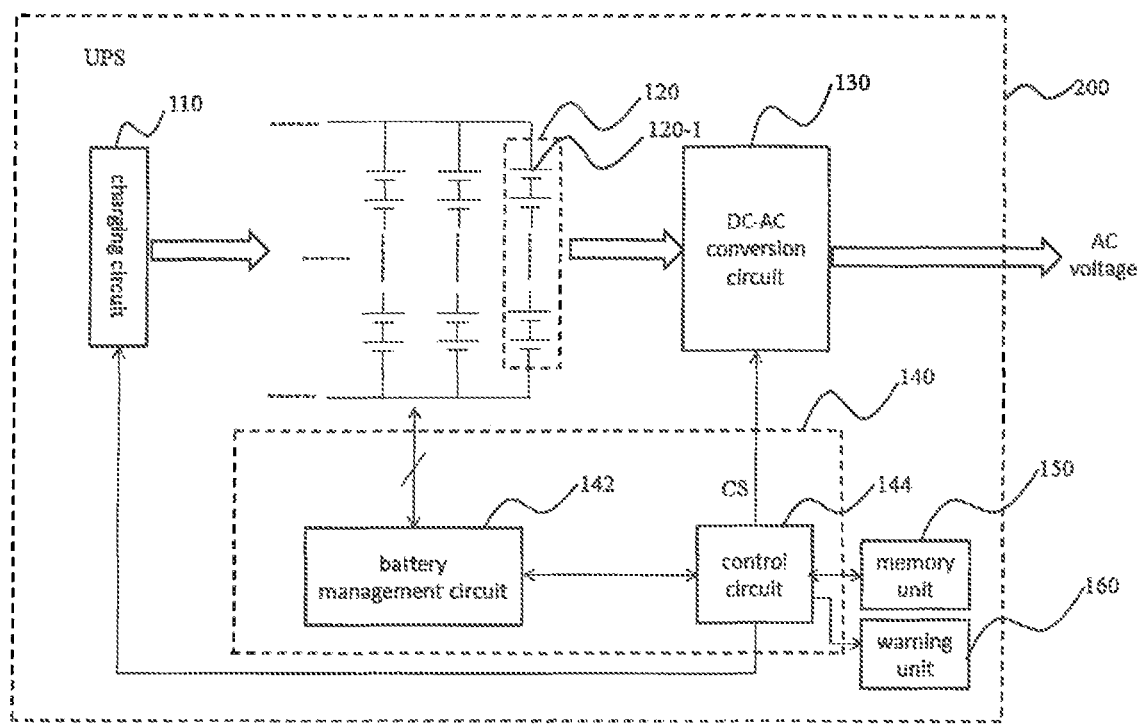
FIG. 2 shows a UPS according to another embodiment of the present invention.

FIG. 2 shows a UPS according to another embodiment of the present invention. Compared with the UPS 100 shown in FIG. 1, the UPS 200 shown in FIG. 2 further comprises a memory unit 150 and a warning unit 160. The memory unit 150 is electrically coupled to the control circuit 144 and configured to record a plurality of EOD voltages corresponding to different discharge currents of the batteries. In this way, the control circuit 144 just needs to access these information stored in the memory unit 150 instead of storing them. In addition, since the UPS 200 is configured with the warning unit 160, the control circuit 144 can further calculate an average voltage of the batteries 120-1 in each battery string 120, and can further control the warning unit 160 to send out a warning signal when a voltage difference between a measured voltage and its corresponding average voltage reaches a preset value. Certainly, whether to configure the memory unit 150 and the warning unit 160 in a UPS depends on the actual design requirements.

Figure 3:
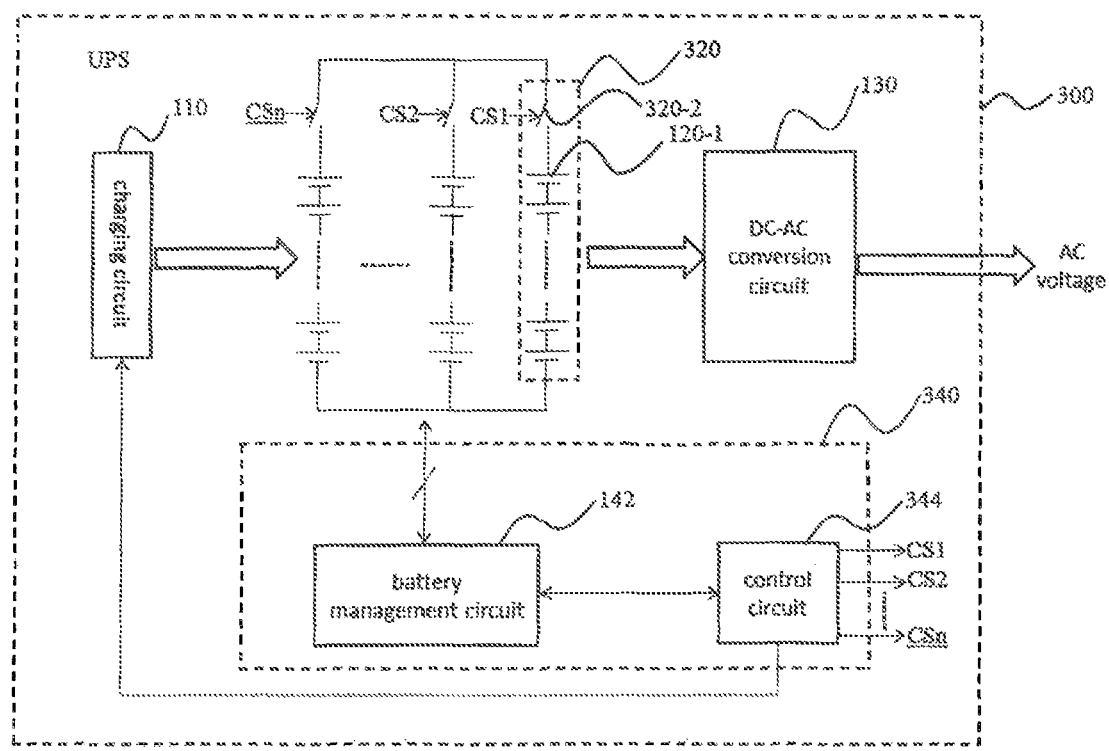
FIG. 3 shows a UPS according to still another embodiment of the present invention.

FIG. 3 shows a UPS according to still another embodiment of the present invention. Compared with the UPS 100 shown in FIG. 1, each battery string 320 in the UPS 300 shown in FIG. 3 further comprises a switch 320-2 connected in series. Each switch 320-2 may be connected in series at any position in the corresponding battery string 320, for example, in series with one end of the corresponding battery string 320 or in series between any two batteries 120-1 in the corresponding battery string 320. In addition, the control circuit 344 of the battery management apparatus 340 is configured to output the control signals CS1-CSn, where n is a natural number. When the control circuit 344 determines that there is a measured voltage having dropped to an EOD voltage corresponding to a discharge current of a corresponding battery, the control circuit 344 outputs a control signal to turn off the switch 320-2 in the corresponding battery string 320. For example, the control circuit 344 may output the control signal CS1 to turn off the corresponding switch 320-2, or output the control signals CS1 and CS3 to turn off the corresponding two switches 320-2. This stops the problematic battery strings from discharging and disconnects them from other battery strings. Certainly, in each battery string having been stopped discharging has at least one battery 120-1 whose voltage drops to an EOD voltage corresponding to its discharge current.

Figure 4:
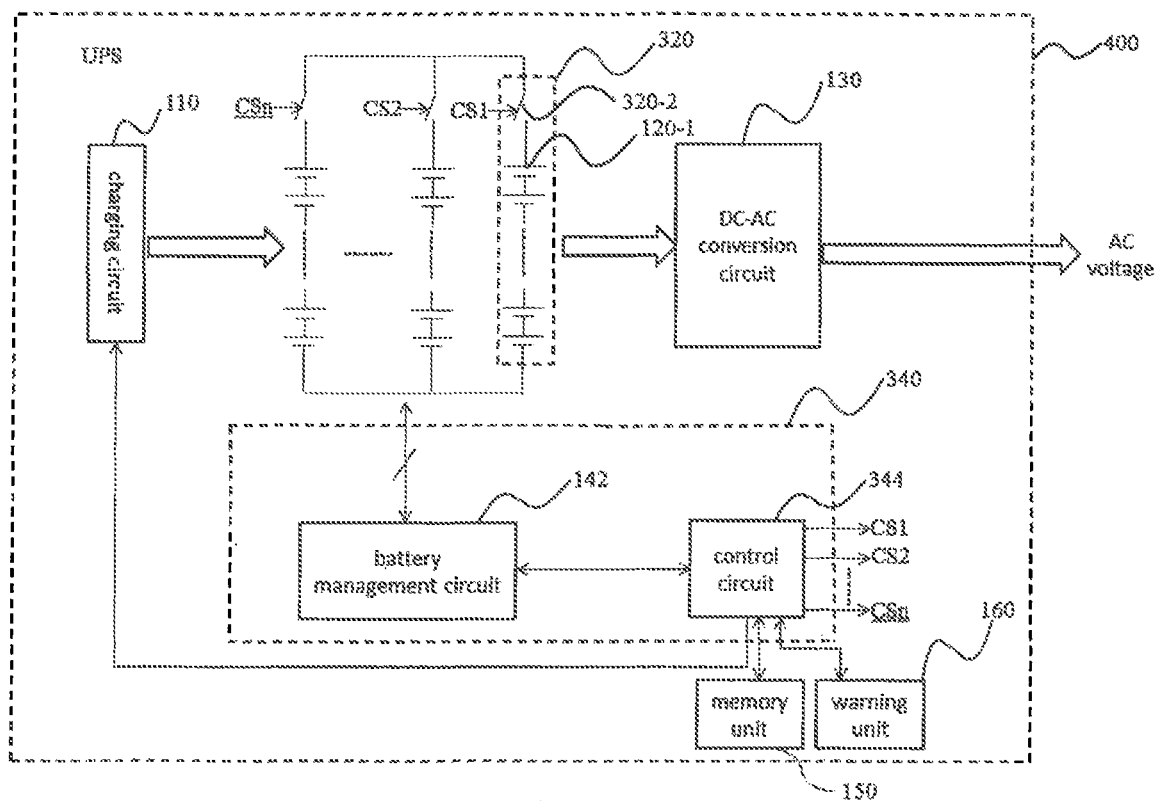
FIG. 4 shows a UPS according to yet another embodiment of the present invention.

FIG. 4 shows a UPS according to yet another embodiment of the present invention. Compared with the UPS 300 shown in FIG. 3, the UPS 400 shown in FIG. 4 further comprises a memory unit 150 and a warning unit 160. Certainly, whether to configure the memory unit 150 and the warning unit 160 in a UPS depends on the actual design requirements.

In the above embodiments, each of the batteries 120-1 comprises a lead-acid battery. However, this is not a limitation to the present invention. In addition, although in the foregoing embodiments all the battery strings 120 are disposed inside the case of the UPS, this is also not a limitation to the present invention. Those skilled in the art should know that all the battery strings 120 may be disposed outside the case of the UPS for external connection, or a part of the battery strings 120 are disposed inside the case while the other strings 120 are disposed outside the case.

From the teachings of the foregoing embodiments, those skilled in the art can understand that, in the UPS of the present invention, the control circuit controls the UPS to stop the discharging of at least one battery string when it determines that there is a measured voltage having dropped to an EOD voltage corresponding to a discharge current of a corresponding battery. In each battery string having been stopped discharging has at least one battery 120-1 whose voltage drops to an EOD voltage corresponding to its discharge current.

In addition, from the teachings of the foregoing embodiments, those skilled in the art can also understand that the present invention also provides a corresponding battery management apparatus, which is suitable to be used in a UPS. The battery management apparatus comprises a battery management circuit and a control circuit. The battery management circuit is electrically coupled to each battery of at least one battery string for measuring the voltage of each battery. As for the control circuit, it is electrically coupled to the battery management circuit. When the battery strings discharge, the control circuit obtains the voltage of each battery through the battery management circuit to calculate the discharge current of each battery, and determines whether there is any measured voltage having dropped to an EOD voltage corresponding to a discharge current of a corresponding battery. When the determination result is positive, the control circuit outputs a control signal. Thus, a back-end circuit of the control circuit can perform a corresponding battery protection according to the control signal. For example, the DC-AC conversion circuit can be shut down or disabled based on the control signal to stop all the batteries from discharging, or the switch in the problematic battery string can be turned off according to the control signal so that the problematic battery string stops discharging.

In summary, when the battery strings discharge, the control circuit of the present invention obtains the voltage of each battery through the battery management circuit to calculate the discharge current of each battery, and determines whether there is any measured voltage having dropped to an EOD voltage corresponding to a discharge current of a corresponding battery. When the determination result is positive, the control circuit stops the discharging of the problematic battery string through some control manners, so as to protect the batteries and prolong the life of the batteries.

While the disclosure has been described by way of example and in terms of the preferred embodiments, it is to be understood that the disclosure is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An uninterruptible power system for providing an alternating current voltage, comprising:
   a battery management circuit, electrically coupled to each battery of at least one battery string for measuring the voltage of each battery; and
   a control circuit, electrically coupled to the battery management circuit, for obtaining the voltage of each battery through the battery management circuit when the battery strings discharge, calculating the discharge current of each battery accordingly, determining whether there is any measured voltage having dropped to an EOD voltage corresponding to a discharge current of a corresponding battery, and stopping the discharging of at least one battery string in which there is at least one measured voltage having dropped to an EOD voltage corresponding to a discharge current of a corresponding battery when the determination result is positive.

2. The uninterruptible power system of claim 1, further comprising a DC-AC conversion circuit, wherein the DC-AC conversion circuit is electrically coupled to the battery strings, and when the control circuit determines that there is a measured voltage having dropped to an EOD voltage corresponding to a discharge current of a corresponding battery, the control circuit outputs a control signal to disable the DC-AC conversion circuit to stop the discharging of all the battery strings.

3. The uninterruptible power system of claim 2, wherein the DC-AC conversion circuit is configured to provide the alternating current voltage to a load, and the control circuit is configured to calculate the discharge current of each battery according to a power consumption of the load, a conversion efficiency of the DC-AC conversion circuit, a total number of the batteries and the measured voltages.

4. The uninterruptible power system of claim 1, wherein the battery management circuit is further configured to perform a voltage balancing operation on the batteries.

5. The uninterruptible power system of claim 4, further comprising a charging circuit, wherein when the charging circuit charges the battery strings, the control circuit obtains the voltage of each battery through the battery management circuit, and determines whether there is any measured voltage having risen to an overcharge threshold, whenever the determination result is positive, the control circuit controls the charging circuit to suspend charging the battery strings.

6. The uninterruptible power system of claim 1, further comprising a warning unit electrically coupled to the control circuit, wherein the control circuit further calculates an average voltage of the batteries in each battery string, and when a voltage difference between a measured voltage and its corresponding average voltage reaches a preset value, the control circuit controls the warning unit to send out a warning signal.

7. The uninterruptible power system of claim 1, wherein each of the battery strings comprises a switch connected in series, and when the control circuit determines that there is a measured voltage having dropped to an EOD voltage corresponding to a discharge current of a corresponding battery, the control circuit outputs a control signal to turn off the switch in a corresponding battery string.

8. The uninterruptible power system of claim 1, wherein each of the batteries comprises a lead-acid battery.

9. The uninterruptible power system of claim 1, wherein the control circuit records a plurality of EOD voltages corresponding to different discharge currents of the batteries.

10. The uninterruptible power system of claim 1, further comprising a memory unit electrically coupled to the control circuit, wherein the memory unit records a plurality of EOD voltages corresponding to different discharge currents of the batteries.

11. A battery management apparatus, comprising:
a battery management circuit, electrically coupled to each battery of at least one battery string for measuring the voltage of each battery; and
a control circuit, electrically coupled to the battery management circuit, for obtaining the voltage of each battery through the battery management circuit when the battery strings discharge, calculating the discharge current of each battery accordingly, determining whether there is any measured voltage having dropped to an EOD voltage corresponding to a discharge current of a corresponding battery, and outputting a control signal when the determination result is positive.

12. The battery management apparatus of claim 11, wherein the control signal is configured to disable a DC-AC conversion circuit electrically coupled to the battery strings.

13. The battery management apparatus of claim 12, wherein the battery strings are used for supplying power required by a load through the DC-AC conversion circuit, and the control circuit is configured to calculate the discharge current of each battery according to a power consumption of the load, a conversion efficiency of the DC-AC conversion circuit, a total number of the batteries and the measured voltages.

14. The battery management apparatus of claim 11, wherein the battery management circuit is further configured to perform a voltage balancing operation on the batteries.

15. The battery management apparatus of claim 14, wherein when a charging circuit charges the battery strings, the control circuit obtains the voltage of each battery through the battery management circuit, and determines whether there is any measured voltage having risen to an overcharge threshold, whenever the determination result is positive, the control circuit controls the charging circuit to suspend charging the battery strings.

16. The battery management apparatus of claim 11, wherein the control circuit further calculates an average voltage of the batteries in each battery string, and when a voltage difference between a measured voltage and its corresponding average voltage reaches a preset value, the control circuit controls a warning unit to send out a warning signal.

17. The battery management apparatus of claim 11, wherein each of the battery strings comprises a switch connected in series, and when the control circuit determines that there is a measured voltage having dropped to an EOD voltage corresponding to a discharge current of a corresponding battery, the control circuit outputs a control signal to turn off the switch in a corresponding battery string.

18. The battery management apparatus of claim 11, wherein each of the batteries comprises a lead-acid battery.

19. The battery management apparatus of claim 11, wherein the control circuit records a plurality of EOD voltages corresponding to different discharge currents of the batteries.

20. The battery management apparatus of claim 11, wherein the control circuit is further electrically coupled to a memory unit, the memory unit is used for recording a plurality of EOD voltages corresponding to different discharge currents of the batteries.

* * * * *